United States Patent
Bresniker et al.

(10) Patent No.: US 7,043,650 B2
(45) Date of Patent: *May 9, 2006

(54) SYSTEM AND METHOD FOR INTELLIGENT CONTROL OF POWER CONSUMPTION OF DISTRIBUTED SERVICES DURING PERIODS WHEN POWER CONSUMPTION MUST BE REDUCED

(75) Inventors: Kirk M. Bresniker, Roseville, CA (US); Thane M. Larson, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 593 days.

This patent is subject to a terminal disclaimer.

(21) Appl. No.: 10/000,703

(22) Filed: Oct. 31, 2001

(65) Prior Publication Data

US 2003/0084359 A1    May 1, 2003

(51) Int. Cl.
*G06F 1/26* (2006.01)

(52) U.S. Cl. .................. 713/324; 713/310; 713/330; 713/340

(58) Field of Classification Search ......... 713/300–340
See application file for complete search history.

(56) References Cited

U.S. PATENT DOCUMENTS

| | | | | |
|---|---|---|---|---|
| 4,611,289 A | * | 9/1986 | Coppola | 713/300 |
| 4,747,041 A | * | 5/1988 | Engel et al. | 713/324 |
| 5,381,554 A | * | 1/1995 | Langer et al. | 714/14 |
| 5,761,084 A | * | 6/1998 | Edwards | 700/293 |
| 6,367,022 B1 | * | 4/2002 | Gillespie et al. | 713/300 |
| 6,392,872 B1 | * | 5/2002 | Doustou et al. | 361/681 |
| 6,601,181 B1 | * | 7/2003 | Thomas | 713/340 |

* cited by examiner

*Primary Examiner*—Jeffrey Gaffin
*Assistant Examiner*—Alan S. Chen

(57) ABSTRACT

A system and method intelligently control power consumption of distributed services using a computer system that provides independent computing elements each capable of entering a power saving mode. In accordance with the present invention, three different algorithms are disclosed. The first algorithm is a reduced load power saving algorithm. As the load decreases, duplicate instances of services can be gracefully suspended and the host processor cards hosting these instances can enter a power saving mode. The second algorithm is a priority-based power consumption reduction algorithm. If power consumption must be reduced, services having less of a contribution to revenue are suspended before components that having a higher contribution to revenue. The third algorithm is a minimal power-consuming redundant computing hardware algorithm that allows a "cold spare" host processing card to be pressed into service if another card fails.

18 Claims, 10 Drawing Sheets

SYSTEM AND METHOD FOR INTELLIGENT CONTROL OF POWER CONSUMPTION OF DISTRIBUTED SERVICES DURING PERIODS WHEN POWER CONSUMPTION MUST BE REDUCED

CROSS-REFERENCE TO RELATED APPLICATIONS

The present application contains subject matter related to a U.S. application entitled "System and Method for Intelligent Control of Power Consumption of Distributed Services During Periods of Reduced Load", which has been assigned Hewlett-Packard Docket Number 10013497-1, and a U.S. application entitled "System and Method for Providing Minimal Power-consuming Redundant Computing Hardware for Distributed Services" which has been assigned Hewlett-Packard Docket Number 100111613-1. Both applications are filed on even date with the present application, are assigned to the same assignee as the present application, and name exactly the same inventors as the present application.

FIELD OF THE INVENTION

The present invention relates to controlling power consumption of distributed services, such as Internet-based E-services and other types of distributed applications. More specifically, the present invention relates to hosting distributed services on a hardware platform having a plurality of computing elements that can gracefully enter a power saving mode, and managing distributed services on the computing elements to maximize revenue, minimize power consumption, and provide redundancy.

DESCRIPTION OF THE RELATED ART

In the art of computing, managing power consumption is becoming increasingly important for a variety of reasons. First, the power consumption of individual components continues to increase. Including on-die cache memories, modem central processing units (CPUs) will soon have hundreds of millions of transistors on a single die. A single Itanium™ CPU, which is a product of Intel Corporation, can consume as much as 130 watts of electricity. Accordingly, it is easy to see how a multiprocessor (MP) system having four or eight CPUs, along with the power consumption of the memory modules, chipset, video system, hard disk drives, networking hardware, cooling fans, and all the other components needed to implement a modem MP system can easily consume thousands of watts.

Furthermore, with the increasing popularity of the Internet and "always on" infrastructures, many such computer systems many be deployed in a data center. For example, a modern data center may have hundreds of system racks, with each system rack having four or more MP systems, as described above. Of course, such data centers need air conditioning systems to remove the heat generated by all these computer systems, and the air conditioning systems themselves consume significant power. In addition, lighting, redundant power subsystems, and security systems all contribute to the power consumption of a data center. When all these factors are taken into account, it is not difficult to see that modern data centers can consume megawatts of electricity and have electric bills that reach thousands of dollars per day.

In addition, reliable and economic sources of electricity have recently become a concern. With a shortage of electrical generating capacity in many regions of the United States, rolling blackouts have been implemented. When a rolling blackout occurs, a data center will typically have very little advance warning, if any, before electrical service is interrupted. Many data centers have redundant power sources, such as on-site diesel generators. However, providing enough redundant generation capacity to meet all the electrical needs of a data center can be quite expensive.

Because of shortages of electrical generating capacity, many electric utilities have implemented a tiered system of electrical rates. For example, customers who agree to minimize or eliminate electrical usage during periods of electrical shortages pay a significantly lower rate than customers who cannot tolerate an interruption in electrical service.

Many data centers are used to host distributed applications that provide E-services. For example, consider an on-line retailer that sells books to customers over the Internet. The term "distributed application" will be used herein to refer to all the components necessary to allow a customer to browse the web site of the retailer and place an order, and allow the order to be completed and shipped. Accordingly, the distributed application will include a product catalog component to allow the customer to browse the products offered by the online retailer, an order processing component to allow the customer to place an order, an inventory component to inform the customer whether the desired product is available, or how long it will be delayed, a payment authorization component for communicating with the customer's credit card company, a component that allows the customer to post book reviews, read the reviews of others, and see a list of books that the customer may enjoy, a shipment tracking component to allow the customer to track the shipping progress of an order, an order fulfillment component to inform the warehouse to ship the customer's order, a vendor ordering component to order additional inventory from the vendor, an email component to send various confirmation and status messages to the customer, a customer management component for allowing the customer to maintain a profile that facilitates features such as "one-click" ordering, and so on. Of course, this is only a partial list, and the distributed application of a sophisticated on-line retailer will have many other components as well.

Traditionally, an on-line retailer, or any other business that uses a distributed application, must provide enough computing resources to allow all components of the distributed application to operate smoothly during periods of peak loads. However, only a fraction of the computing resources needed for peak loads are actually required for off-peak loads. Nevertheless, in the prior-art, all hardware resources have tended to be powered up 24 hours a day, seven days a week.

Furthermore, the availability of individual components do not contribute equally to the revenue of an on-line retailer. For example, from a revenue perspective, it is extremely important that a customer be able to browse a product catalog and place an order 24 hours a day, seven days a week. However, it may be less important, from a revenue perspective, to allow a customer to post a review of a book or check the shipping status of an order.

Finally, it is often desirable to provide a distributed application having redundancy. One term used in the art is "N+1" redundancy. Basically, if N components are needed to provide a service, "N+1" components are provided. If one of the N components fails, the service is gracefully shifted to the redundant "+1" component, and the distributed application continues operating normally. However, "N+1" redundancy also increases power consumption because the "+1" component tends to be "hot". In other word, the redundant component remains powered up waiting for a failure in one of the other components. Accordingly, redundancy also increases the power consumption of a distributed application. Of course, redundancy increases revenue for a business that depends on a distributed application because the availability of the application is increased by minimizing down time.

As discussed above, managing power consumption is becoming increasingly important in view of the cost, reliability, and availability of energy supplies. What is needed in the art is a way to allow a business that uses a distributed application to intelligently control power consumption of components of the distributed services by minimizing power consumption during periods of off-peak loads, prioritizing and powering down nonessential components during periods of reduced energy supply availability, and providing redundancy without consuming extra power.

SUMMARY OF THE INVENTION

The present invention provides a system and method for intelligent control of power consumption of distributed services and components, such as those used to implement a distributed applications. The present invention is best implemented on a computer system that provides independent computing elements capable of being powered down or entering a power saving mode, thereby allowing individual services or components be powered down. Note that the granularity with which the power consumption of a distributed application can be varied is provided by the ability of cause individual host processor cards or other computing elements to enter a power saving mode.

In accordance with the present invention, three different algorithms are disclosed. The first algorithm is a reduced load power saving algorithm. Assume that a distributed application is configured to execute on a server system in anticipation of peak loads. As the load decreases, not all components of the distributed application are required, and duplicate instances of components can be gracefully suspended and the host processor cards hosting these instances can enter power saving mode. As the load increases, the host processor cards can be returned to normal operation mode, the operating system for each card can be loaded, and the components can be reinitialized. This algorithm saves money by curtailing energy usage of the distributed application during periods of off-peak loads.

The second algorithm in accordance with the present invention is a priority-based power consumption reduction algorithm. This algorithm exploits the fact that not all components of a distributed application contribute equally to the revenue stream of a business using the distributed application. In accordance with the present invention, if power consumption must be reduced, components having less of a contribution to revenue (or for some other reason, lower priority) should be suspended to save power before components that having a higher contribution to revenue (or for some other reason, higher priority). Thereafter, the host processor cards hosting these instances can enter power saving mode. As power supplies return to normal levels, the host processor cards can be returned to normal operation mode, the operating system for each card can be loaded, and the suspended components can be reinitialized.

Note that power consumption may need to be curtailed for a number of reasons. For example, during periods of reduced energy supplies, a business may be informed that power must be cut by a certain percentage. Similarly, a rolling blackout (or other type of power failure) may strike a business, and perhaps the backup power supplies are not capable of supplying the full power needs of the distributed application. Some utilities have peak demand pricing, and perhaps the contribution of any particular component is outweighed by the cost of energy during certain periods. In addition, an air conditioning unit may fail, and it may be necessary to reduce power consumption to allow the remaining air conditioning units to provide adequate cooling. Of course, one can envision many other situations where it is necessary or desirable to curtail power usage.

Finally, the third algorithm of the present is a minimal power-consuming redundant computing hardware algorithm that provides "N+1" or greater redundancy for the other host processing cards. Basically, one or more host processor cards can be provided as cold spares. If a current failure or impending failure is detected in one of the other cards, the cold spare card enters normal operation mode from power saving mode. Thereafter, the operating system is loaded, and the components of the distributed application that are hosted by the failing card are initialized and begin operating on the cold spare card. At this point, the components executing on the failing card can be gracefully shut down, if possible, and the failing card can be placed into hot swap mode. Once in hot swap mode, the failing card can be replaced with a replacement card. Note that at this point, the replacement can remain in hot swap/power saving mode and serve as the new cold spare. Alternatively, the replacement card can enter normal operation mode, the components can be moved to the replacement card, and cold spare can be placed into power saving mode and resume its function as a cold spare.

In summary, the present invention provides a number of benefits that reduce costs, increase reliability, and address the current realities associated with the generation and distribution of energy supplies.

DETAILED DESCRIPTION OF THE PREFERRED EMBODIMENTS

The present invention provides a system and method for intelligent control of power consumption of distributed services and components, such as those used to implement a distributed application. The present invention is best implemented on a computer system that provides independent computing elements capable of being powered down or entering a power saving mode, thereby allowing individual services to be suspended. One such computer system was disclosed in U.S. patent application Ser. No. 09/924,024, which was filed on Aug. 7, 2001, has the same assignee as the present application, names exactly the same inventors as the present application, is entitled "System and Method for Power Management in a Server System", and is hereby incorporated by reference. Before considering the present invention in detail below, first consider the system disclosed in U.S. patent application Ser. No. 09/924,024.

Figure 1:
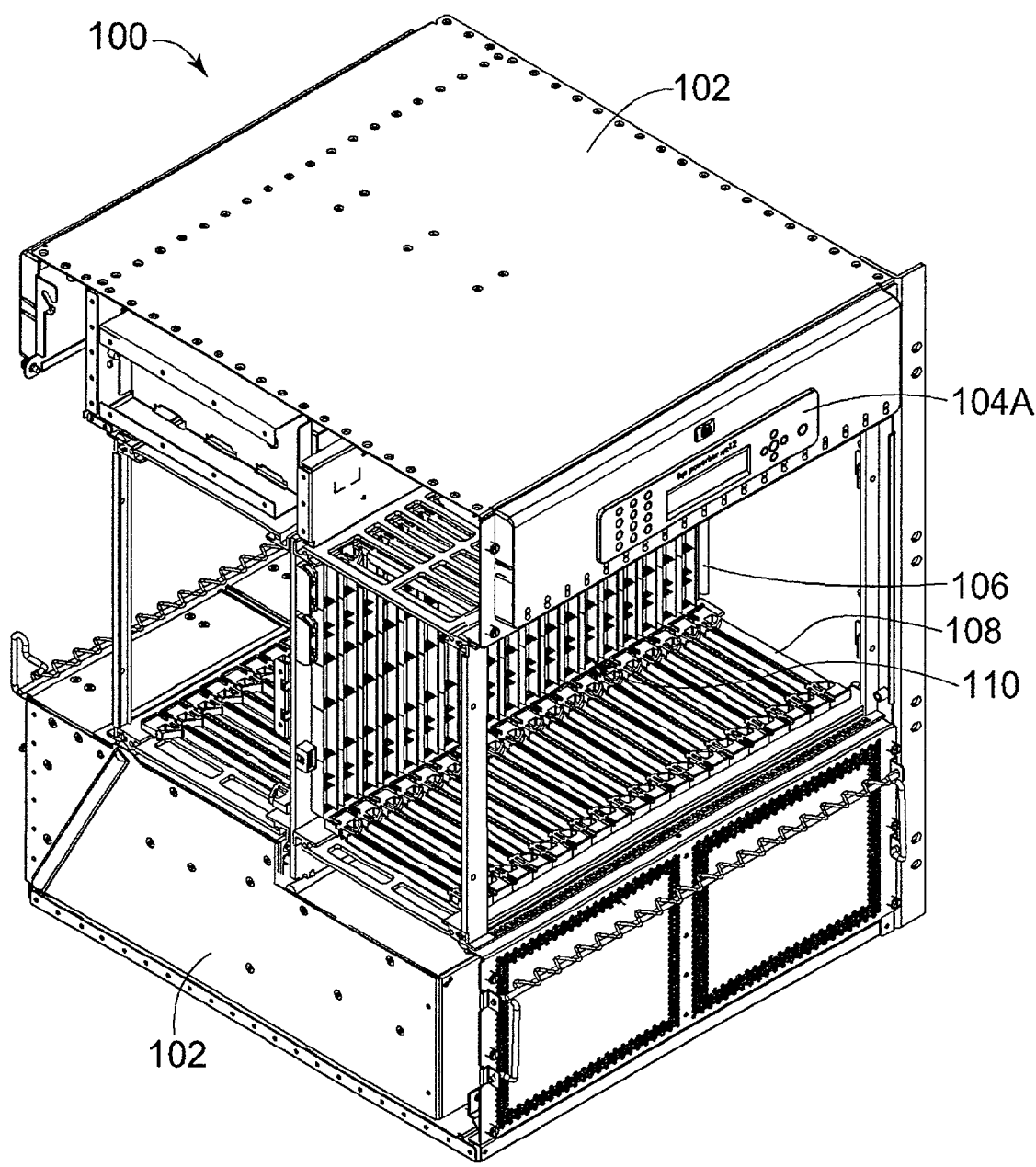
FIG. 1 is a front perspective view illustrating a server system capable of hosting the present invention.
Figure 2:
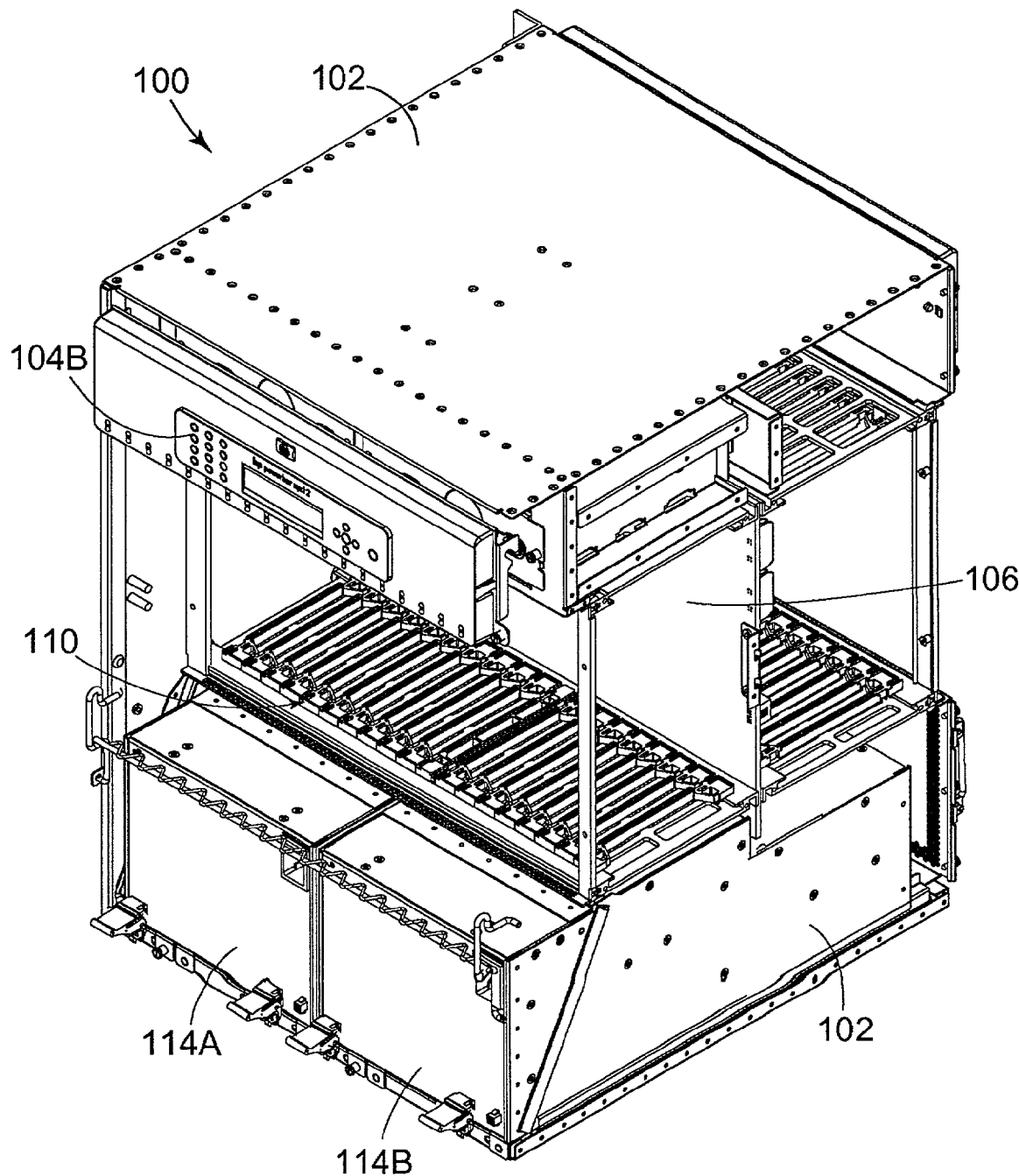
FIG. 2 is a rear perspective view illustrating the server system shown in FIG. 1.

FIG. 1 is a front perspective view illustrating a server system 100 capable of operating with the present invention. FIG. 2 is a rear perspective view illustrating server system 100. Server system 100 includes panels 102, liquid crystal display (LCD) panels 104A and 104B (collectively referred to as LCD panels 104), backplane 106, chassis 108, and dual redundant power supply units 114A and 114B (collectively referred to as power supply units 114). Panels 102 are attached to chassis 108, and provide protection for the internal components of server system 100. Backplane 106 is positioned near the center of server system 100. Backplane 106 is also referred to as midplane 106. LCD panels 104A and 104B are substantially identical, except for their placement on server system 100. LCD panel 104A is positioned on a front side of server system 100, and LCD panel 104B is positioned on a back side of server system 100. Power supply units 114 are positioned at the bottom of server system 100 and extend from a back side of server system 100 to a front side of server system 100. Power supply units 114 each include an associated cooling fan 304 (shown in block form in FIG. 3). Additional cooling fans 304 may also be positioned behind LCD panel 104B. In configuration, four chassis cooling fans 304 are used in server system 100. In another configuration, six chassis cooling fans 304 are used. Other numbers and placement of cooling fans 304 may be used. Cooling fans 304 may also be configured in a "N+1" redundant cooling system, where "N" represents the total number of necessary fans 304, and "+1" represents the number of redundant fans 304.

In one configuration, server system 100 supports the Compact Peripheral Component Interconnect (cPCI) form factor of printed circuit assemblies (PCAs). Server system 100 includes a plurality of cPCI slots 110 for receiving cards/modules 300 (shown in block form in FIG. 3). In one configuration, system 100 includes ten slots 110 on each side of backplane 106 (referred to as the ten-slot configuration). In an alternative configuration, system 100 includes 19 slots 110 on each side of backplane 106 (referred to as the 19-slot configuration). Of course, additional alternative configurations can use other slot configurations.

Figure 3:
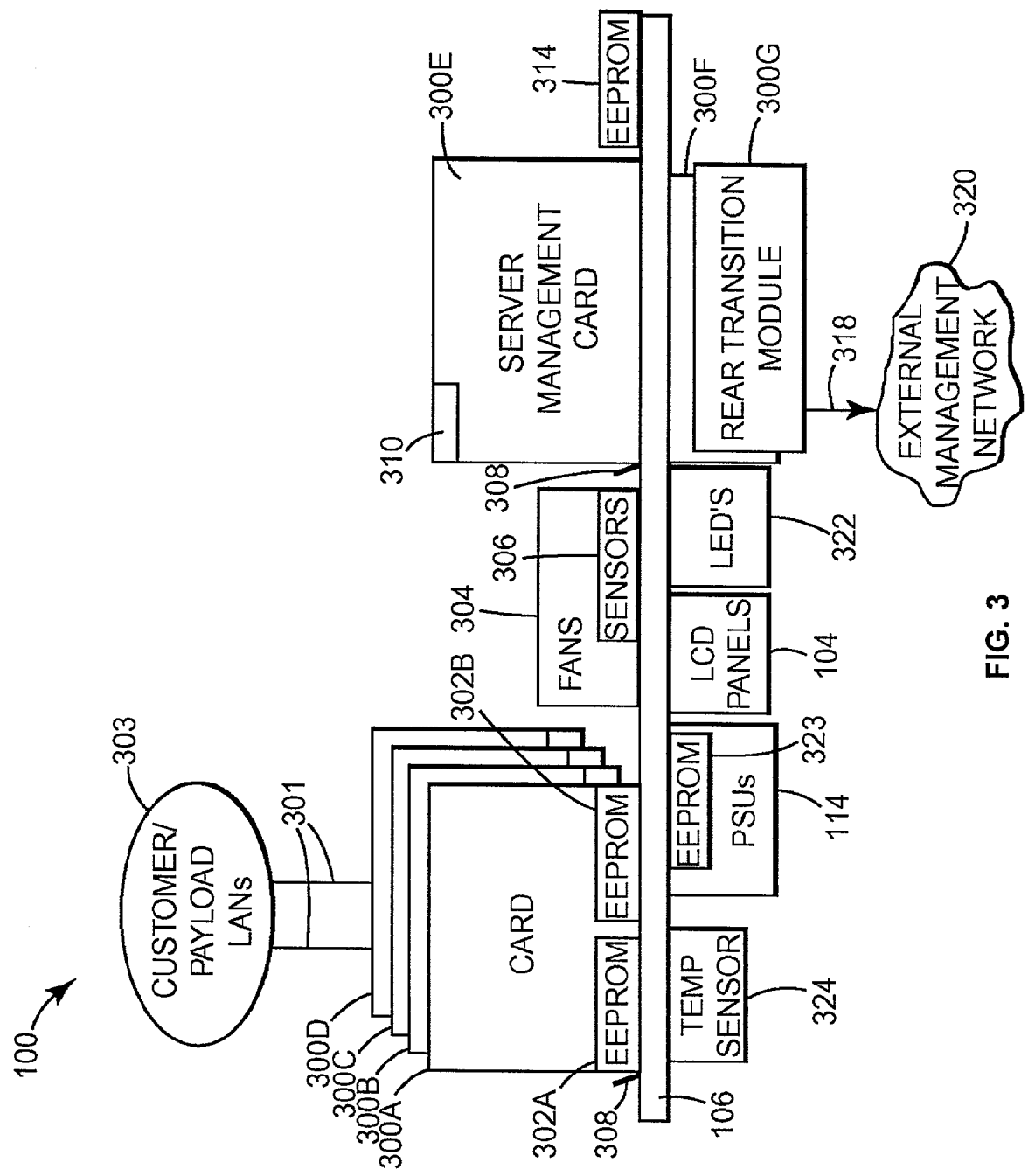
FIG. 3 is a block diagram illustrating major components of one configuration of the server system of FIG. 1.

FIG. 3 is a block diagram illustrating major components of server system 100. Server system 100 includes backplane 106, a plurality of cards/modules 300A–300G (collectively referred to as cards 300), fans 304, electrically erasable programmable read only memory (EEPROM) 314, LEDs 322, LCD panels 104, power supply units (PSUs) 114, and temperature sensor 324. Cards 300 are inserted in slots 110 (shown in FIGS. 1 and 2) in system 100. In one form configuration, cards 300 may occupy more than one slot 110. In another configuration, cards 300 include host processor cards 300A, hard disk cards 300B, managed Ethernet switch cards 300C and 300D, a server management card (SMC) 300E, and two redundant SMC local area network (LAN) rear transition modules (RTMs) 300F and 300G. In one configuration, there is one managed Ethernet switch card 300C fitted in the ten-slot chassis configuration, and up to two managed Ethernet switch cards 300C and 300D fitted in the 19-slot chassis embodiment. Managed Ethernet switch cards 300C and 300D may be implemented using "Procurve" managed Ethernet switch cards.

In one configuration, two types of host processor cards 300A may be used in server system 100—PA-RISC host processor cards and IA32 host processor cards. Of course, other types of host processor cards can also be used, such as IA64 host processor cards. Multiple host processor cards 300A and hard disk cards 300B are used in configurations of server system 100, but are each represented by a single card in FIG. 3 to simply the figure. In another configuration, up to eight host processor cards 300A are used in the ten-slot configuration, and up to 16 host processor cards 300A are used in the 19-slot configuration Each of cards 300 is capable of being hot swapped.

In one configuration, cards 300 each include a pair of EEPROMs 302A and 302B, which are discussed below. Power supply units 114 each include an EEPROM 323 for storing power supply identification and status information. Fans 304 include associated sensors 306 for monitoring the speed of the fans 304. LEDs 322 may also include eight status LEDs, six LAN LEDs to indicate the speed and link status of LAN links 318, a blue hot swap status LED to indicate the ability to hot swap SMC 300E, a power-on indicator LED, and three fan control indicator LEDs.

The operational health of cards 300 and system 100 are monitored by SMC 300E to ensure the reliable operation of the system 100. SMC 300E includes serial ports 310 (discussed below), and an extraction lever 308 with an associated switch. In one embodiment, all cards 300 include an extraction lever 308 with an associated switch.

In one configuration, SMC 300E is the size of a typical compact PCI (cPCI) card, and supports PA-RISC and the IA32 host processor cards 300A. Of course, as mentioned above, other types of host processor cards can also be used, such as IA64 host processor cards. SMC 300E electrically connects to other components in system 100, including cards 300, temperature sensor 324, power supply units 114, fans 304, EEPROM 314, LCD panels 104, LEDs 322, and SMC rear transition modules 300F and 300G via backplane 106. In most cases, the connections are via $I^2C$ buses 554 (shown in FIG. 5), as described in further detail below. The $I^2C$ buses 554 allow bi-directional communication so that status information can be sent to SMC 300E and configuration information sent from SMC 300E. In another configuration, SMC 300E uses $I^2C$ buses 554 to obtain environmental information from power supply units 114, host processor cards 300A, and other cards 300 fitted into system 100.

SMC 300E also includes a LAN switch 532 (shown in FIG. 5) to connect console management LAN signals from the host processor cards 300A to an external management network (also referred to as management LAN) 320 via one of the two SMC rear transition modules 300F and 300G. In one configuration, the two SMC rear transition modules 300F and 300G each provide external 10/100Base-T LAN links 318 for connectivity to management LAN 320. In another configuration, SMC rear transition modules 300F and 300G are fibre channel, port bypass cards.

Managed Ethernet switch cards 300C and 300D are connected to host processor cards 300A through backplane 106, and include external 10/100/1000Base-T LAN links 301 for connecting host processor cards to external customer or payload LANs 303. Managed Ethernet switch cards 300C and 300D are fully managed LAN switches.

Figure 4:
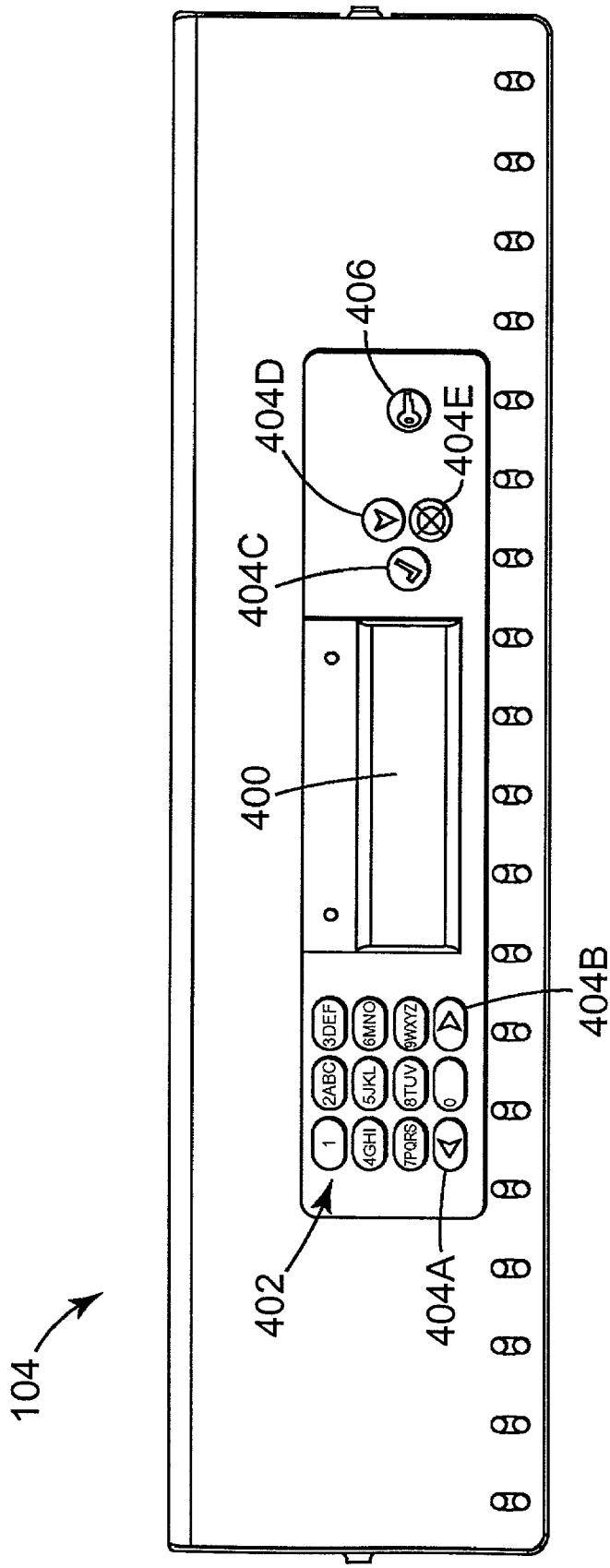
FIG. 4 is a front view of one of the LCD panels used by the server system of FIG. 1.

FIG. 4 is a front view of one of LCD panels 104. In one configuration, each LCD panel 104 includes a 2×20 LCD display 400, ten alphanumeric keys 402, five menu navigation/activation keys 404A–404E (collectively referred to as navigation keys 404), and a lockout key 406 with associated LED (not shown) that lights lockout key 406. If a user presses a key 402, 404, or 406, an alert signal is generated and SMC 300E polls the LCD panels 104A and 104B to determine which LCD panel was used, and the key that was pressed.

Alphanumeric keys 402 allow a user to enter alphanumeric strings that are sent to SMC 300E. Navigation keys 404 allow a user to navigate through menus displayed on LCD display 400, and select desired menu items. Navigation keys 404A and 404B are used to move left and right, respectively, within the alphanumeric strings. Navigation key 404C is an "OK/Enter" key. Navigation key 404D is used to move down. Navigation key 404E is a "Cancel" key.

LCD panels 104 provide access to a test shell (discussed below) that provides system information and allows configuration of system 100. As discussed below, other methods of access to the test shell are also provided by system 100. To avoid contention problems between the two LCD panels 104, and the other methods of access to the test shell, a lockout key 406 is provided on LCD panels 104. A user can press lockout key 406 to gain or release control of the test shell. In one configuration, lockout key 406 includes an associated LED to light lockout key 406 and indicate a current lockout status.

In configuration, LCD panels 104 also provide additional information to that displayed by LEDs 322 during start-up. If errors are encountered during the start-up sequence, LCD panels 104 provide more information about the error without the operator having to attach a terminal to one of the SMC serial ports 310.

Figure 5:
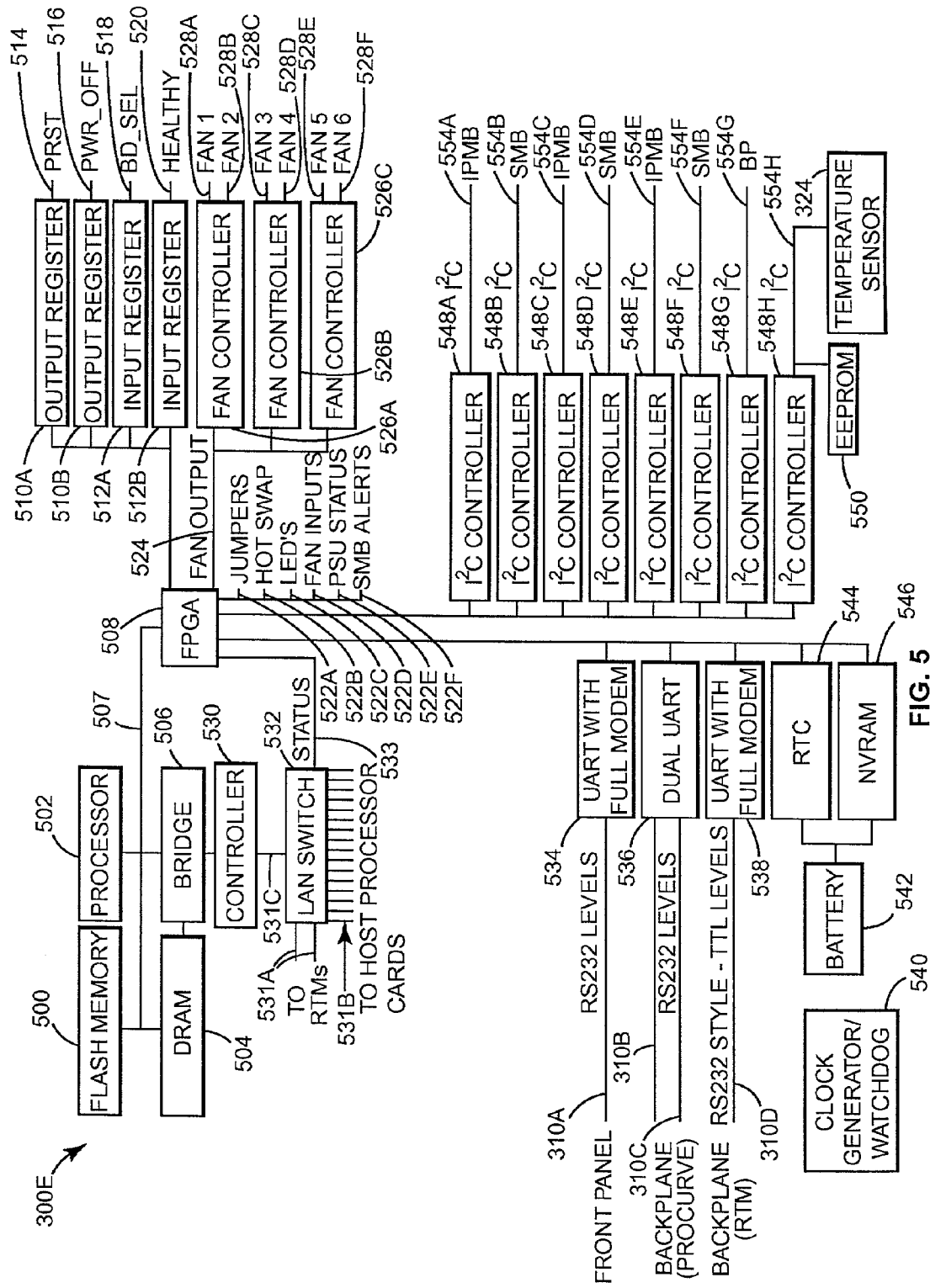
FIG. 5 is an electrical block diagram illustrating major components of a server management card shown in FIG. 3.

FIG. 5 is an electrical block diagram illustrating major components of server management card (SMC) 300E. SMC 300E includes flash memory 500, processor 502, dynamic random access memory (DRAM) 504, PCI bridge 506, field programmable gate array (FPGA) 508, output registers 510A and 510B, input registers 512A and 512B, fan controllers 526A–526C (collectively referred to as fan controllers 526), network controller 530, LAN switch 532, universal asynchronous receiver transmitter (UART) with modem 534, dual UART 536, UART with modem 538, clock generator/watchdog 540, battery 542, real time clock (RTC) 544, non-volatile random access memory (NVRAM) 546, I²C controllers 548A–548H (collectively referred to as I²C controllers 548), EEPROM 550, and temperature sensor 324. In one configuration, components of SMC 300E are connected together via PCI buses 507. In another configuration, PCI buses 507 are not routed between slots 110. Switched LAN signals through LAN switch 532 are routed between slots 110.

Functions of SMC 300E include supervising the operation of other components within system 100 (e.g. fan speed, temperature, card present) and reporting their health to a central location (e.g., external management network 320), reporting any failures to a central location (e.g., external management network 320), providing a LAN switch 532 to connect console management LAN signals from the SMC 300E and host processor cards 300A to an external management network 320, and providing an initial boot configuration for the system 100.

SMC 300E includes chassis management processor 502. In one configuration, chassis management processor 502, also referred to as SMC processor 502, is a StrongARM SA-110 processor with supporting buffer. In another configuration, SMC 300E uses a Linux operating system. SMC 300E also runs server management application (SMA) software/firmware. In one configuration, the operating system and SMA are stored in flash memory 500, and all information needed to power-up SMC 300E, and for SMC 300E to become operational, are stored in flash memory 500. In one configuration, flash memory 500 includes 4 to 16 Mbytes of storage space to allow SMC 300E to boot-up as a stand-alone card (i.e., no network connection needed).

SMC 300E also includes DRAM 504. In one configuration, DRAM 504 includes 32, 64 or 128 Mbytes of storage space, and a hardware fitted table is stored in DRAM 504. The hardware fitted table includes information representing the physical configuration of system 100. The hardware fitted table changes if there is a physical change to system 100, such as by a hardware device being added to or removed from system 100. The hardware fitted table includes hardware type information (e.g., whether a device is an IA32/PA-RISC/IA64/Disk Carrier/RTM (i.e., rear transition module)/PSU/LCD panel/Modem/Unknown device, etc.), hardware revision and serial number, status information, configuration information, and hot-swap status information.

Processor 502 is coupled to FPGA 508. FPGA 508 includes six sets of input/output lines 522A–522F. Lines 522A are connected to jumpers for configuring SMC 300E. Lines 522B are hot swap lines for monitoring the hot swap status of cards 300. In one configuration, hot swap lines 522B include 18 hot swap status input lines, which allow SMC 300E to determine the hot swap status of the host processor cards 300A, hard disk cards 300B, managed Ethernet switch cards 300C and 300D, SMC rear transition modules 300F and 300G, and power supply units 114. Lines 522C are LED lines that are coupled to LEDs 322. Lines 522D are fan input lines that are coupled to fan sensors 306 for monitoring the speed of fans 304. Lines 522E are power supply status lines that are coupled to power supply units 114 for determining whether both, or only one power supply unit 114 is present. Lines 522F are SMB alert lines for communicating alert signals related to SMB I²C buses 554B, 554D, and 554F.

SMC 300E includes a real time clock (RTC) 544 and an associated battery 542 to preserve the clock. Real time clock 544 provides the correct time of day. SMC 300E also includes NVRAM 546 for storing clock information. In one embodiment, NVRAM 546 uses the same battery as real time clock 544.

SMC 300E sends and receives management LAN communications through PCI bridge 506 and controller 530 to LAN switch 532. In one configuration, LAN switch 532 is an unmanaged LAN switch including 19 ports, with two ports connected to SMC rear transition modules 300F and 300G (shown in FIG. 3) via links 531A for communications with external management network 320 (shown in FIG. 3), 16 ports for connecting to the management LAN connections of up to 16 host processor cards 300A via links 531B through backplane 106, and one port for connecting to the SMC's LAN port (i.e., output of controller 530) via links 531C. SMC 300E provides management support for console LAN management signals sent and received through LAN switch 532. SMC 300E provides control of management LAN signals of host processor cards 300A, managed Ethernet switches 300C and 300D, SMC processor 502, and SMC rear transition modules 300F and 300G. SMC 300E monitors the status of the management LAN connections of up to 16 host processor cards 300A to LAN switch 532, and reports an alarm event if any of the connections are lost. FPGA 508 and LAN switch 532 are coupled together via an RS-232 link 533 for the exchange of control and status information.

Server system 100 includes eight $I^2C$ buses 554A–554H (collectively referred to as $I^2C$ buses 554) to allow communication with components within system 100. $I^2C$ buses 554 are coupled to FPGA 508 via $I^2C$ controllers 548. In one configuration, the $I^2C$ buses 554 include 3 intelligent platform management bus (IPMB) buses 554A, 554C, and 554E, three system management bus (SMB) buses 554B, 554D, and 554F, a backplane ID bus (BP) 554G, and an $I^2C$ bus 554H for accessing SMC EEPROM 550 and chassis temperature sensor 324. A different number and configuration of $I^2C$ buses 554 may be used depending upon the desired implementation. SMC 300E maintains a system event log (SEL) within non-volatile flash memory 500 for storing information gathered over $I^2C$ buses 554.

The IPMB $I^2C$ buses 554A, 554C, and 554E implement the intelligent platform management interface (IPMI) specification. The IPMI specification is a standard defining an abstracted interface to platform management hardware. IPMI is layered over the standard $I^2C$ protocol. SMC 300E uses one or more of the IPMB $I^2C$ buses 554A, 554C, and 554E to retrieve static data from each of the host processor cards 300A and hard disk cards 300B. The static data includes identification information for identifying each of the cards 300A and 300B. Each slot 110 in system 100 can be individually addressed to retrieve the static configuration data for the card 300 in that slot 110. In one configuration, the host processor cards 300A and hard disk cards 300B each include an EEPROM 302A (shown in FIG. 3) that stores the static identification information retrieved over IPMB $I^2C$ buses 554A, 554C, and 554E. In another configuration, each EEPROM 302A contains the type of card, the name of the card, the hardware revision of the card, the card's serial number and card manufacturing information.

SMC 300E also uses one or more of the IPMB $I^2C$ buses 554A, 554C, and 554E, to retrieve dynamic environmental information from each of the hostprocessor cards 300A and hard disk cards 300B. In one configuration, this dynamic information is held in a second EEPROM 302B (shown in FIG. 3) on each of the cards 300A and 300B. The dynamic board data can include card temperature and voltage measurements. SMC 300E can also write information to the EEPROMs 302A and 302B on cards 300.

The three SMB $I^2C$ buses 554B, 554D, and 554F also implement the IPMI specification. The three SMB $I^2C$ buses 554B, 554D, and 554F, are coupled to LEDs 322, the two LCD panels 104, the dual redundant power supply units 114, and some of the host processor cards 300A. SMC 300E uses one or more of the SMB $I^2C$ buses 554B, 554D, and 554F, to provide console communications via the LCD panels 104. In order for the keypad key-presses on the LCD panels 104 to be communicated back to SMC 300E, an alert signal is provided when keys are pressed that causes SMC 300E to query LCD panels 104 for the keys that were pressed.

SMC 300E communicates with power supply units 114 via one or more of the SMB $I^2C$ buses 554B, 554D, and 554F to obtain configuration and status information including the operational state of the power supply units 114. In one configuration, the dual redundant power supply units 114 provide voltage rail measurements to SMC 300E. A minimum and maximum voltage value is stored by the power supply units 114 for each measured rail. The voltage values are polled by SMC 300E at a time interval defined by the current configuration information for SMC 300E. If a voltage measurement goes out of specification, defined by maximum and minimum voltage configuration parameters, SMC 300E generates an alarm event. In one configuration, power supply units 114 store configuration and status information in their associated EEPROMs 323 (shown in FIG. 3).

Backplane ID Bus (BP) 554G is coupled to backplane EEPROM 314 (shown in FIG. 3) on backplane 106. SMC 300E communicates with the backplane EEPROM 314 over the BP bus 554G to obtain backplane manufacturing data, including hardware identification and revision number. On start-up, SMC 300E communicates with EEPROM 314 to obtain the manufacturing data, which is then added to the hardware fitted table. The manufacturing data allows SMC 300E to determine if it is in the correct chassis for the configuration it has on board, since it is possible that the SMC 300E has been taken from a different chassis and either hot-swapped into a new chassis, or added to a new chassis and the chassis is then powered up. If there is no valid configuration on board, or SMC 300E cannot determine which chassis it is in, then SMC 300E waits for a pushed configuration from external management network 320, or for a manual user configuration via one of the connection methods discussed below.

In one configuration, there is a single temperature sensor 324 within system 100. SMC 300E receives temperature information from temperature sensor 324 over $I^2C$ bus 554H. SMC 300E monitors and records this temperature and adjusts the speed of the cooling fans 304 accordingly, as described below. SMC also uses $I^2C$ bus 554H to access EEPROM 550, which stores board revision and manufacture data for SMC 300E.

SMC 300E includes four RS-232 interfaces 310A–310D (collectively referred to as serial ports 310). RS-232 serial interface 310A is via a 9-pin Male D-type connector on the front panel of SMC 300E. The other three serial ports 310B–310D are routed through backplane 106. The front panel RS-232 serial interface 310A is connected via a UART with a full modem 534 to FPGA 508, to allow monitor and debug information to be made available via the front panel of SMC 300E. Backplane serial port 310D is also connected via a UART with a full modem 538 to FPGA 508. In one configuration, backplane serial port 310D is intended as a debug or console port. The other two backplane serial interfaces 310B and 310C are connected via a dual UART 536 to FPGA 508, and are routed to managed Ethernet switches 300C and 300D through backplane 106. These two backplane serial interfaces 310B and 310C are used to connect to and configure the managed Ethernet switch cards 300C and 300D, and to obtain status information from the managed Ethernet switch cards 300C and 300D.

In one configuration, server system 100 includes six chassis fans 304. Server system 100 includes temperature sensor 324 to monitor the chassis temperature, and fan sensors 306 to monitor the six fans 304. In addition, fan sensors 306 can indicate whether a fan 304 is rotating and the fan's speed setting. In one configuration, FPGA 508 includes six fan input lines 522D (i.e., one fan input line 522D from each fan sensor 306) to monitor the rotation of the six fans 304, and a single fan output line 524 coupled to fan controllers 526A–526C. Fan controllers 526A–526C control the speed of fans 304 by a PWM (pulse width modulation) signal via output lines 528A–528F. If a fan 304 stalls, the monitor line 522D of that fan 304 indicates this condition to FPGA 508, and an alarm event is generated. The speed of fans 304 is varied to maintain an optimum operating temperature versus fan noise within system 100. If the chassis temperature sensed by temperature sensor 324 reaches or exceeds a temperature alarm threshold, an alarm event is generated. When the temperature reduces below the alarm threshold, the alarm event is cleared. If the temperature reaches or exceeds a temperature critical threshold, the physical integrity of the components within system 100 are considered to be at risk, and SMC 300E performs a system shut-down, and all cards 300 are powered down except SMC 300E. When the chassis temperature falls below the critical threshold and has reached the alarm threshold, SMC 300E restores the power to all of the cards 300 that were powered down when the critical threshold was reached.

In one configuration, SMC 300E controls the power state of cards 300 using power reset (PRST) lines 514 and power off (PWR_OFF) lines 516. FPGA 508 is coupled to power reset lines 514 and power off lines 516 via output registers 510A and 510B, respectively. In one embodiment, power reset lines 514 and power off lines 516 each include 19 output lines that are coupled to cards 300. SMC 300E uses power off lines 516 to turn off the power to selected cards 300, and uses power reset lines 514 to reset selected cards 300. In one configuration, a lesser number of power reset and power off lines are used for the 10 slot chassis configuration.

SMC 300E is protected by both software and hardware watchdog timers. The watchdog timers are part of clock generator/watchdog block 540, which also provides a clock signal for SMC 300E. The hardware watchdog timer is started before software loading commences to protect against failure. In one configuration, the time interval is set long enough to allow a worst-case load to complete. If the hardware watchdog timer expires, SMC processor 502 is reset.

In one configuration, SMC 300E has three phases or modes of operation—Start-up, normal operation, and hot swap. The start-up mode is entered on power-up or reset, and controls the sequence needed to make SMC 300E operational. SMC 300E also provides minimal configuration information to allow chassis components to communicate on the management LAN. The progress of the start-up procedure can be followed on LEDs 322, which also indicate any errors during start-up.

The normal operation mode is entered after the start-up mode has completed. In the normal operation mode, SMC 300E monitors the health of system 100 and its components, and reports alarm events. SMC 300E monitors the chassis environment, including temperature, fans, input signals, and the operational state of the host processor cards 300A.

SMC 300E reports alarm events to a central point, namely an alarm event manager, via the management LAN (i.e., through LAN switch 532 and one of the two SMC rear transition modules 300F or 300G to external management network 320). The alarm event manager is an external module that is part of external management network 320, and that handles the alarm events generated by server system 100. The alarm event manager decides what to do with received alarms and events, and initiates any recovery or reconfiguration that may be needed. In addition to sending the alarm events across the management network, a system event log (SEL) is maintained in SMC 300E to keep a record of the alarms and events. The SEL is held in non-volatile flash memory 500 in SMC 300E and is maintained over power cycles, and resets of SMC 300E.

In the normal operation mode, SMC 300E may receive and initiate configuration commands and take action on received commands. The configuration commands allow the firmware of SMC processor 502 and the hardware controlled by processor 502 to be configured. This allows the operation of SMC 300E to be customized to the current environment. Configuration commands may originate from the management network 320, one of the local serial ports 310 via a test shell (discussed below), or one of the LCD panels 104.

The hot swap mode is entered when there is an attempt to remove a card 300 from system 100. In one configuration, all of the chassis cards 300 can be hot swapped, including SMC 300E, and the two power supply units 114. An application shutdown sequence is initiated if a card 300 is to be removed. The shutdown sequence performs all of the steps needed to ready the card 300 for removal. Note that the hot swap mode will be used to support the present invention, as described in greater detail below. By removing a distributed application component from a chassis card 300, power consumption of the distributed application can be reduced. In addition, by providing a chassis card 300 that normally is powered down in hot swap mode, a "cold spare" can be provided. Should a chassis card 300 hosting a distributed application component fail, the "cold spare" chassis card 300 can be powered up to normal operation mode, and the component that was executing on the failed chassis card 300 can be moved to the "cold spare" chassis card 300.

In one embodiment, FPGA 508 includes 18 hot swap status inputs 522B. These inputs 522B allow SMC 300E to determine the hot swap status of host processor cards 300A, hard disk cards 300B, managed Ethernet switch cards 300C and 300D, SMC rear transition module cards 300F and 300G, and power supply units 114. The hot-swap status of the SMC card 300E itself is also determined through this interface 522B.

An interrupt is generated and passed to SMC processor 502 if any of the cards 300 in system 100 are being removed or installed. SMC 300E monitors board select (BD_SEL) lines 518 and board healthy (HEALTHY) lines 520 of cards 300 in system 100. In one configuration, board select lines 518 and healthy lines 520 each include 19 input lines, which are connected to FPGA 508 via input registers 512A and 512B, respectively. SMC 300E monitors the board select lines 518 to sense when a card 300 is installed. SMC 300E monitors the healthy lines 520 to determine whether cards 300 are healthy and capable of being brought out of a reset state.

When SMC 300E detects that a card has been inserted or removed, an alarm event is generated. When a new card 300 is inserted in system 100, SMC 300E determines the type of card 300 that was inserted by polling the identification EEPROM 302A of the card 300. Information is retrieved from the EEPROM 302A and added to the hardware fitted table. SMC 300E also configures the new card 300 if it has not been configured, or if its configuration differs from the expected configuration. When a card 300, other than the SMC 300E, is hot-swapped out of system 100, SMC 300E updates the hardware fitted table accordingly.

In one configuration, SMC 300E is extracted in three stages: (1) an interrupt is generated and passed to the SMC processor 502 when the extraction lever 308 on the SMC front panel is set to the "extraction" position in accordance with the Compact PCI specification, indicating that SMC 300E is about to be removed; (2) SMC processor 502 warns the external management network 320 of the SMC 300E removal and makes the extraction safe; and (3) SMC processor 502 indicates that SMC may be removed via the blue hot swap LED 322. SMC 300E ensures that any application download and flashing operations are complete before the hot swap LED 322 indicates that the card 300E may be removed.

In one configuration, there are two test shells implemented within SMC 300E. There is an application level test shell that is a normal, run-time, test shell accessed and used by users and applications. There is also a stand-alone test shell that is a manufacturer test shell residing in flash memory 500 that provides manufacturing level diagnostics and functions. The stand-alone test shell is activated when SMC 300E boots and an appropriate jumper is in place on SMC 300E. The stand-alone test shell allows access to commands that the user would not, or should not have access to.

The test shells provide an operator interface to SMC 300E. This allows an operator to query the status of system 100 and (with the required authority level) to change the configuration of system 100.

A user can interact with the test shells by a number of different methods, including locally via a terminal directly attached to one of the serial ports 310, locally via a terminal attached by a modem to one of the serial ports 310, locally via one of the two LCD panels 104, and remotely via a telnet session established through the management LAN 320. A user may connect to the test shells by connecting a terminal to either the front panel serial port 310A or rear panel serial ports 310B–310D of SMC 300E, depending on the console/modem serial port configuration. The RS-232 and LAN connections provide a telnet console interface. LCD panels 104 provide the same command features as the telnet console interface. SMC 300E can function as either a dial-in facility, where a user may establish a link by calling to the modem, or as a dial-out facility, where SMC 300E can dial out to a configured number.

The test shells provide direct access to alarm and event status information. In addition, the test shells provides the user with access to other information, including temperature logs, voltage logs, chassis card fitted table, and the current setting of all the configuration parameters. The configuration of SMC 300E may be changed via the test shells. Any change in configuration is communicated to the relevant cards 300 in system 100. In one configuration, configuration information downloaded via a test shell includes a list of the cards 300 expected to be present in system 100, and configuration data for these cards 300. The configuration information is stored in flash memory 500, and is used every time SMC 300E is powered up.

In one embodiment, power usage values by watt are embedded in an identification (ID) EEPROM of each field replaceable unit (FRU), which includes cards 300 and fans 304. For example, cards 300 (shown in FIG. 3) each include ID EEPROM 302A, and SMC 300E includes EEPROM 550, for storing power usage values of each of these cards. In one embodiment, fans 304 also include an ID EEPROM. In one form of the invention, the power rating of each FRU 300 and 304 is also visibly color-coded on the FRU's bulkhead or an appropriately placed label.

In one configuration, SMC 300E polls the ID EEPROMs 302A and 550 of the FRUs 300 and 304 via one of the I$^2$C buses 554 to obtain the power usage of each FRU 300 and 304. SMC 300E also polls EEPROM 323 of power supply units 114, which stores the power capacity of the power supply units 114. SMC 300E compares the power usage values obtained from the FRU ID EEPROMs, with the overall power available in server system 100 obtained from the power supply unit's ID EEPROM 323, and determines if there is sufficient capacity to power up the FRUs 300 and 304. SMC 300E controls the power state of FRUs 300 and 304 based on the comparison of the power usage values with the overall power available. If there is not sufficient capacity to power up the FRUs 300 and 304, SMC 300E does not power up all FRUs 300 and 304, or does not power up selected ones of the FRUs 300 and 304.

In one configuration, there are a total of five voltage rails from power supply units 114, with each rail having a different capacity for power. For example, a power supply unit 114 can have maximum ratings of: 48V×2.5A=120W, 12V×24.0A=288W, 5V×120.0A=600W, 3.3V×150.0A=495W, and −12V×1.5A=18W; with an additional maximum total power constraint for the supply of 1200W. When a card 300 is inserted into a slot 110 of server system 100, SMC 300E compares the power usage values of the other FRUs 300 and 304 to the total power budget of the power supply 114, and determines if the maximum values will be exceeded. If the maximum values will be exceeded, SMC 300E does not power on the inserted card 300, and responds with an error message that is displayed on LCD panel 104.

Since server system 100 can be configured in a semi-infinite number of ways through the loading of its several slots 110, making a configuration chart is difficult for known released modules, and impossible for unknown future power hungry modules. Thus, by having a weighted number system that is automatically calculated by SMC 300E, configurations that would compromise the power integrity of the system 100 can be automatically avoided. Also, since the power supply units 114 can output their abilities (stored in EEPROM 323), upgrading to a higher current supply can be integrated without changing the code or documentation of SMC 300E.

As mentioned above, server system 100, as discussed above with reference to FIGS. 1–5, was disclosed in U.S. patent application Ser. No. 09/924,024. This patent application was incorporated by reference above. Server system 100 provides all the hardware infrastructure necessary to support the present invention. Specifically, system 100 allows any of the cards 300 to be powered down, and the total energy requirements of each card 300 can be easily ascertained, as discussed above.

As mentioned above, the hot swap mode powers down a card 300 in preparation for removing the card. However, the hot swap mode may be used in conjunction with the present invention to control power usage of distributed services. Accordingly, the term power saving mode will be used below. If the present invention is implemented on server system 100, power saving mode and hot swap mode are substantially identical, except that when power saving mode is entered, removal of a card 300 is not anticipated.

However, the present invention, as described below, is not limited to server system 100. Rather, the present invention may be implemented in any computer platform having individual modules that host distributed application components or services and are capable of entering a power saving mode. Specifically, many computer systems have energy saving modes that retain the state of the computer system. For example, some computer systems have a "suspend-to-RAM" (STR) mode that saves the entire state of the computer system in RAM, and powers down all computer components except the RAM. Since RAM tends to use little energy (especially when the RAM contents are static), STR mode consumes little power, and can often be maintained with by a stand-by mode of a power supply that does not require operation of a power supply cooling fan. When the computer returns to normal operation mode from STR mode, the other components are powered back up, the system state is restored from RAM, and the computer system can, in essence, continue from where it left off without having to load the operating system and reinitialize components.

Figure 6:
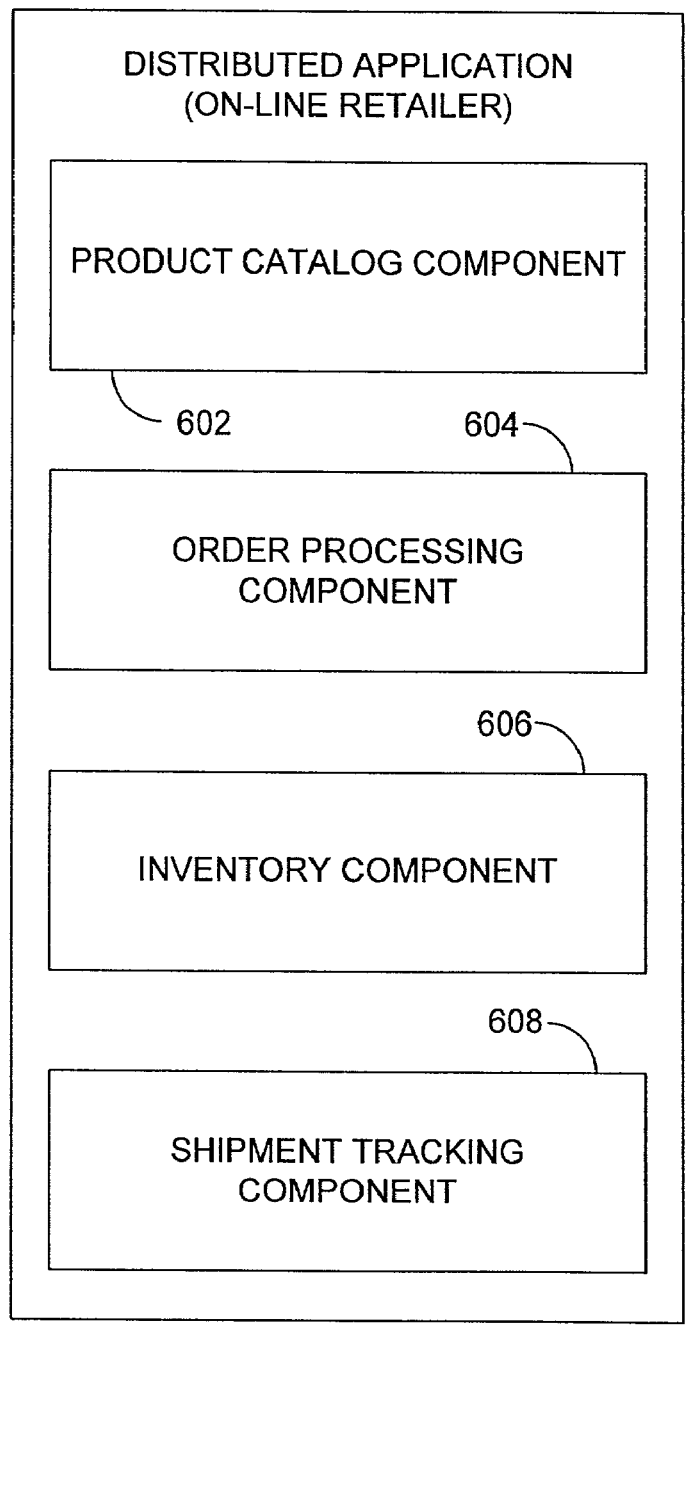
FIG. 6 illustrates several components of a distributed application that is similar to a distributed application used by an on-line retailer.

FIG. 6 illustrates several components for a distributed application 600, which is similar to a distributed application used by an on-line retailer. Application 600 includes a product catalog component 602 to allow a customer to browse the products offered by the on-line retailer, an order processing component 604 to allow the customer to place an order, an inventory component 606 to inform the customer whether the desired product is available, or how long it will be delayed, and a shipment tracking component 608 to allow the customer to track the shipping progress of an order.

As mentioned above, such a distributed application may also include a payment authorization component for communicating with the customer's credit card company, a component that allows the customer to post book reviews, read the reviews of others, and see a list of books that the customer may enjoy, an order fulfillment component to inform the warehouse to ship the customer's order, a vendor ordering component to order additional inventory from the vendor, an email component to send various confirmation and status messages to the customer, a customer management component for allowing the customer to maintain a profile that facilitates features such as "one-click" ordering, and so on. However, the minimal set of components shown in FIG. 6 are sufficient to illustrate the present invention.

Figure 7:
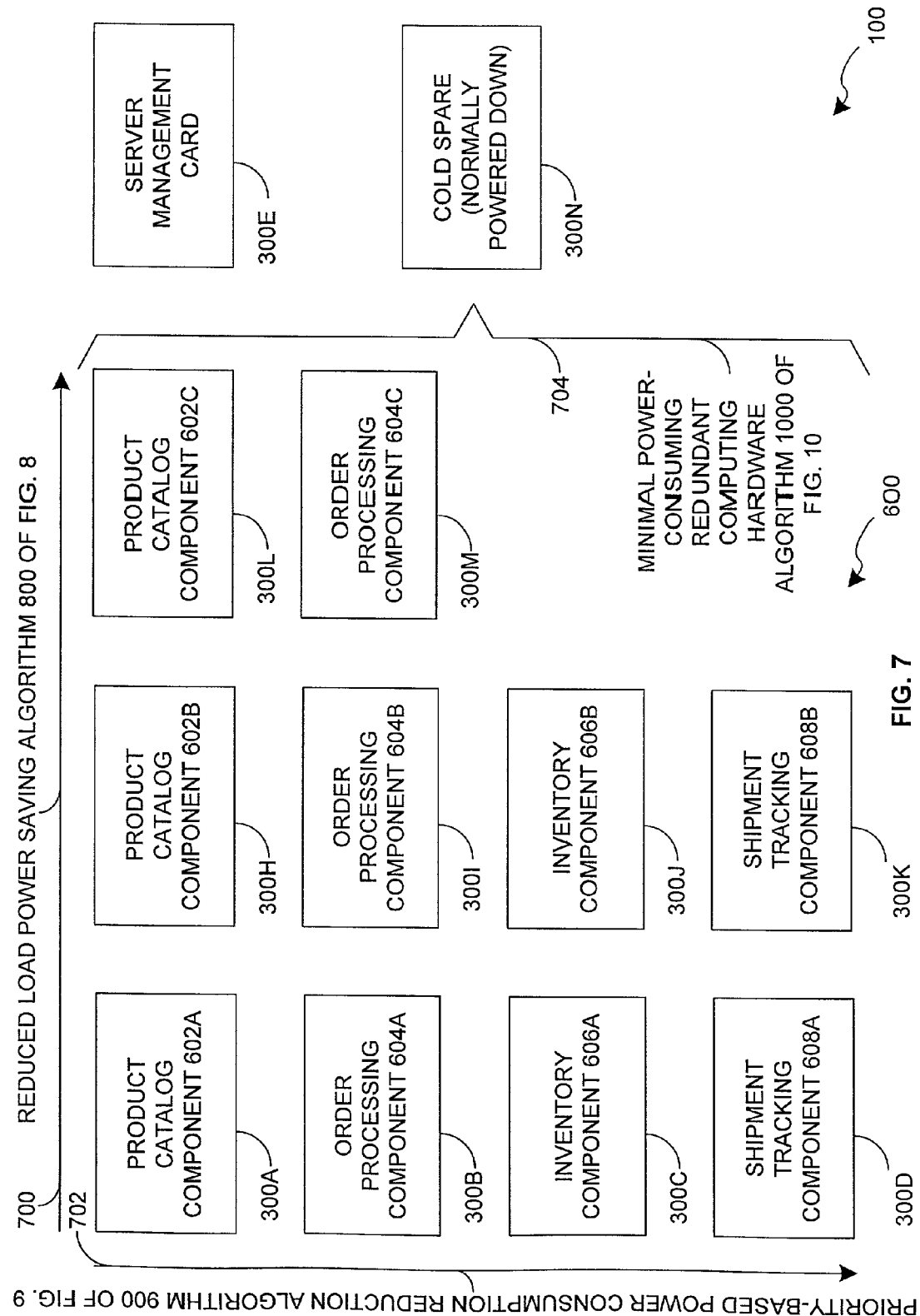
FIG. 7 illustrates how the distributed application of FIG. 6 can be implemented on the server system shown in FIGS. 1–5, in accordance with the present invention.

FIG. 7 illustrates how distributed application 600 of FIG. 6 can be implemented on server system 100 of FIGS. 1–5, in accordance with the present invention. Before discussing FIG. 7 in greater detail, note that in FIG. 3, cards 300A–300B are shown as host processor cards that are coupled to external 10/100/1000Base-T LAN links 301 for connecting the host processor cards to external customer or payload LANs 303. SMC 300E, and RTMs 300F and 300G are provided to support server system 100. FIG. 7 maintains this nomenclature, and also adds host processor cards 300H–300N. Note that cards 300H–300N are also coupled to external 10/100/1000Base-T LAN links 301, and in turn to external customer or payload LANs 303, in a manner similar to cards 300A–300D. Accordingly, at least 14 cards are needed to implement the configuration shown in FIG. 7. As noted above, in one configuration, system 100 includes 19 slots 110 on each side of backplane 106, so this configuration is capable of hosting the distributed application, as shown in FIG. 7.

In FIG. 7, distributed application 600 is configured to accommodate a maximum expected load. Accordingly, three host processor cards 300A, 300H, and 300L are configured to host product catalog component 602. Card 300A hosts product catalog component 602A, card 300H hosts component 602B, and card 300L hosts component 602C. Similarly, three host processor cards 300B, 300I, and 300M are configured to host order processing component 604. Accordingly, card 300B hosts order processing component 604A, card 300I hosts component 604B, and card 300M hosts component 604C.

In a typical distributed application for an on-line retailer, assume that more customers will be browsing the product catalog and placing orders than checking inventory and tracking shipments. Therefore, only two host processor cards are needed to host each of the latter two components. Accordingly, host processor cards 300C and 300J are configured to host inventory component 606, with card 300C hosting inventory component 606A and card 300J hosting inventory component 3606B. Similarly, host processor cards 300D and 300K are configured to host shipment tracking component 608, with card 300D hosting shipment tracking component 608A and card 300K hosting shipment tracking component 608B.

Note that host processor card 300N is provided as a "cold spare". The "cold spare" will be described in greater detail below.

FIG. 7 is a simplified view showing how components of distributed application 600 can be hosted by server system 100. Note that the granularity with which the power consumption of distributed application 600 can be varied is provided by the ability of SMC 300E to cause individual host processor cards to enter the power saving mode. Of course, each host processor card can host multiple distributed application components. For example, each host processor card could host an instance of each distributed component. Alternatively, during periods of light loads, perhaps the inventory component 606 and the shipment tracking component 608 could be hosted by a single processor card. Also note that the assignment of any component to a host processor card is dynamic, and the assignments can also be changed to remove all components from any card, thereby allowing the card to enter power saving mode to adjust the power consumption of the distributed application. However, there is a certain amount of overhead involved in moving components between host processor cards, so it is desirable to assign components to cards based on an anticipated component suspension sequence.

FIG. 7 illustrates in simplified form three different algorithms, in accordance with the present invention. Line 700 represents reduced load power saving algorithm 800 of FIG. 8. As mentioned above, in FIG. 7 application 600 is shown as being configured for an anticipated peak load. However, as the load decreases, not all components shown in FIG. 7 are required, and duplicate instances of components can be gracefully suspended and the host processor cards hosting these instances can enter power saving mode. Conceptually, this can be envisioned in FIG. 7 by moving the rightmost end point of line 700 to the left. For example, during the early morning hours of 1:00 am to 5:00 am, perhaps distributed application 600 can efficiently handle all customer requests using only components 602A, 604A, 606A, and 608A on cards 300A, 300B, 300C, and 300D, respectively. Accordingly, the other components can be gracefully suspended and cards 300H, 300I, 300J, 300K, 300L, and 300M can enter power saving mode, thereby reducing the power consumption of distributed application 600 by 60%. Of course, as load increases, the host processor cards can be returned to normal operation mode, the operating system for each card can be loaded, and the components can be reinitialized.

As discussed above, if each processor card is provided with a power saving mode that saves the state of the computer system, such as a "suspend-to-RAM" (STR) mode, the operating system will already be loaded and the components will already be initialized. Such a mode allows the present invention to alter power consumption of the distributed application very quickly.

Figure 8:
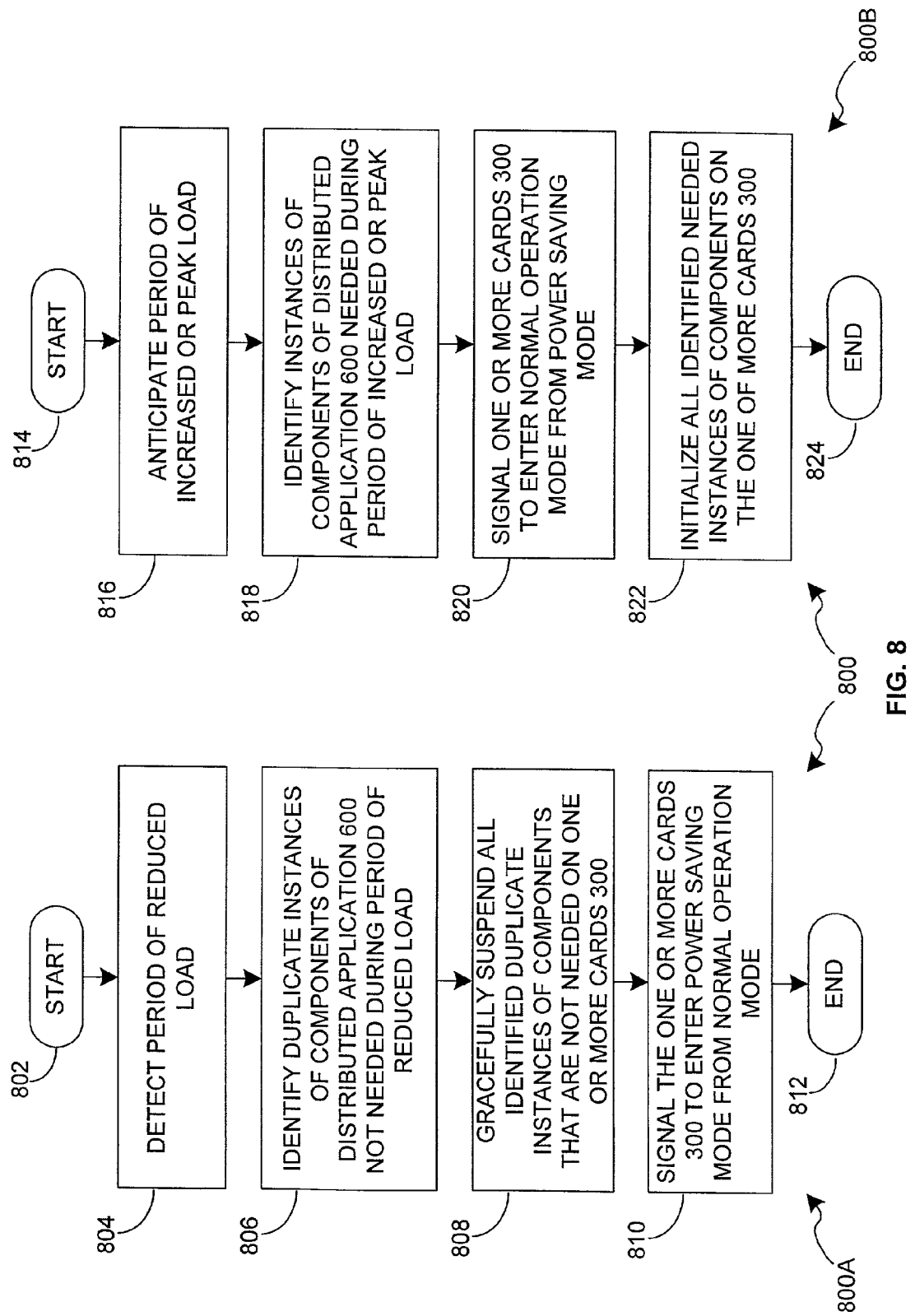
FIG. 8 is a flowchart showing a reduced load power saving algorithm, in accordance with the present invention.

If reduced load power saving algorithm 800 of FIG. 8 was the only power-reducing algorithm to be implemented, it may be desirable to have each host processor card execute all components of distributed application 600, as discussed above. Assuming that reductions in overall load of the distributed application are distributed relatively evenly across all components, the components on any card could be gracefully suspended and host processor cards can enter power saving mode. Such a configuration would provide maximum granularity for varying the power consumption of the distributed application based on transaction loads. However, the present invention encompasses another type of power saving algorithm illustrated by line 702, which represents priority-based power consumption reduction algorithm 900 of FIG. 9.

Algorithm 900 exploits the fact that not all components of a distributed application contribute equally to the revenue stream of a business using the distributed application. In accordance with the present invention, if power consumption must be reduced, components having less of a contribution to revenue (or for some other reason, lower priority) should be suspended to save power before components that having a higher contribution to revenue (or for some other reason, higher priority). With reference to distributed application 600 of FIG. 6, to maintain the revenue stream, it is essential that customers have access to product catalog component 602 to select a product to order, and order processing component 604 to place an order for the product. However, it is less important (although certainly still helpful) to the revenue stream for the customer be able to confirm that the product is in stock or when it will ship using inventory component 606. Furthermore, it is even less important that the customer be able to track shipments using shipment tracking component 608, since a customer will generally not need this function until after an order has been placed and the revenue generated by the order has been secured.

Note that power consumption may need to be curtailed for a number of reasons. For example, during periods of reduced energy supplies, a business may be informed that power must be cut by a certain percentage. Similarly, a rolling blackout (or other type of power failure) may strike a business, and perhaps the backup power supplies are not capable of supplying the full power needs of the distributed application. Some utilities have peak demand pricing, and perhaps the contribution of any particular component is outweighed by the cost of energy during certain periods. In addition, an air conditioning unit may fail, and it may be necessary to reduce power consumption to allow the remaining air conditioning units to provide adequate cooling. Of course, one can envision many other situations where it is necessary or desirable to curtail power usage.

Conceptually, algorithm 900 can be envisioned in FIG. 7 by moving the lowermost end point of line 702 upward. For example, if power consumption must be reduced, the first component of distributed application 600 to be suspended is shipment tracking component 608. Accordingly, components 608A and 608B are gracefully suspended, and cards 300D and 300K can enter power saving mode, thereby reducing the power consumption of distributed application 600 by 20% while preserving full operation of components that contribute more to the revenue stream. If additional power savings are required, inventory components 606A and 606B can be gracefully suspended, and cards 300C and 300J can enter power saving mode, thereby reducing the power consumption of distributed application 600 even further. Note that at this point, the power consumption of distributed application 600 has been reduced 40%, while preserving peak load capacity for the components that contribute most to the revenue stream. Of course, when power supplies can return to normal levels, the host processor cards can be returned to normal operation mode, the operating system for each card can be reinitialized, the components can be reinitialized, and distributed application 600 can once again service peak loads with all components operating.

Figure 10:
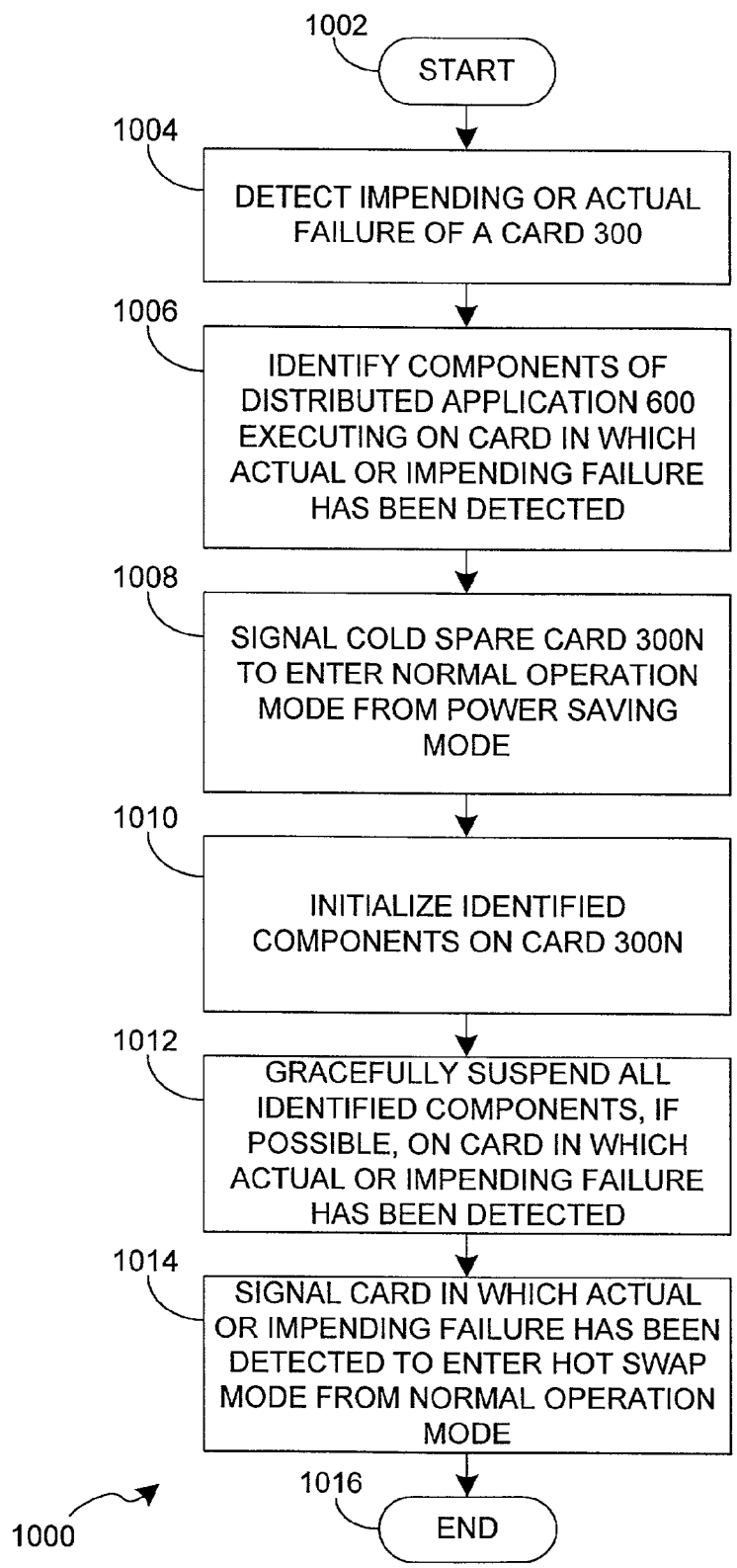
FIG. 10 is a flowchart showing a minimal power-consuming redundant computing hardware algorithm that provides at least "N+1" redundancy, in accordance with the present invention.

Finally, minimal power-consuming redundant computing hardware algorithm 1000 of FIG. 10 is represented by bracket 704, and illustrates how the present invention can provide "N+1" or greater redundancy for the other host processing cards. Basically, one or more host processor cards can be provided as cold spares, such as card 300N in FIG. 7. If a current failure or impending failure is detected in one of the other cards, card 300N enters normal operation mode from power saving mode. Thereafter, the operating system is loaded, and the components of distributed application 600 that are hosted by the failing card are initialized and begin operating on cold spare card 300N. At this point, the components executing on the failing card can be gracefully shut down, if possible, and the failing card can be placed into hot swap mode. Once in hot swap mode, the failing card can be replaced with a replacement card. Note that at this point, the replacement can remain in hot swap/power saving mode and serve as the new cold spare. Alternatively, the replacement card can enter normal operation mode, the components can be moved back to the replacement card, and cold spare can be placed into power saving mode and resume its function as a cold spare.

Furthermore, cold spare 300N can be pressed into service in the event that greater than anticipated peak loads are encountered. However, should this occur, it would be wise to provide additional capacity and thereafter restore card 300N as a cold spare.

As noted above, each card 300 in FIG. 3 has EEPROMs that store the power characteristics of the card. Accordingly, the exact power saving that will be achieved can be determined before deciding how many cards need to enter power saving mode. Also note that the algorithms discussed above can be hosted by SMC 300E, or alternatively, any card or external system in communication with SMC 300E. For example, if the algorithms of the present invention are to be used in a single server system, such as server system 100 of FIG. 1, the algorithms are preferably hosted on the SMC 300E (or similar device) of that server system. Alternatively, if the algorithms of the present invention are used to regulate power usage and provide redundancy for all server systems in a data center, then the algorithms can be hosted by a single system in communication with each SMC 300E (or similar device) in each of the server systems in the data center.

As mentioned above, FIG. 8 illustrates reduced load power saving algorithm 800. In FIG. 8, algorithm 800 is illustrated as a flowchart 800A that shows are power can be saved when loads are reduced, and flowchart 800B shows how additional capacity can be added in anticipation of increased or peak loads, in accordance with the present invention.

Flowchart 800A starts at "START" block 802, and control passes to block 804. Block 804 detects a period of reduced load. Note that in a typical distributed application, load levels may vary in a predictable manner. For example, load levels may be heaviest during business hours, and may be the lightest during the early hours of the morning, as described above. Reduction in load levels can easily be detected by monitoring transactions per second for all components of distributed application 600.

Next control passes to block 806, which identifies duplicate instances of components of distributed application 600 that are not needed during the period of reduced load. For example, in FIG. 7, it may be determined that components 602C, 604C, 606B, and 608B are not needed during at this time to meet current demand. Control then passes to block 808.

Block 808 gracefully suspends all duplicate instances of components that were identified as not being needed at block 806. Note that to place any particular card 300 in power saving mode, all components on that card must be identified as not being needed. In the example above, components 602C, 604C, 606B, and 608B have been identified as not being needed, and are gracefully suspended. Control then passes to block 810.

Block 810 signals the cards in which all components have been suspended to enter power saving mode from normal operation mode. Using the example above, components 602C, 604C, 606B, and 608B were gracefully suspended, so cards 300L, 300M, 300J and 300K are placed in power saving mode.

As discussed above, power saving mode can be implemented by completely removing power to the card, or placing the card in a reduced power mode, such as an STR mode. Note that how a component is gracefully suspended will depend on the type of power saving mode. If power is completely removed from the card, gracefully suspending the component will entail exiting the component and shutting down the operating system. When using a mode such as STR, pending transactions should be allowed to complete, but the component and operating system need not be exited.

Finally control passes to "END" block 812. Note that "START" block 802 and "END" block 812 are shown to illustrate the starting and ending point of flowchart 800A. However, it will typically be desirable to execute the steps shown in flowchart 800A repeatedly. This can be down by looping block 810 back to block 804, or be executing the algorithm illustrated by flowchart 800A at a certain interval, such as once every ten minutes.

Flowchart 800B starts at "START" block 814, and control passes to block 816. Block 816 anticipates an impending period of increased or peak demand. Note that it is desirable to add additional capacity before it is actually required. By during so, distributed application 600 can always service transactions quickly and efficiently. As mentioned above, in a typical distributed application, load levels may vary in a predictable manner, so it is possible to detect an anticipated increase in load by detecting that transactions are increasing along a predicable curve.

Next control passes to block 818, which identifies duplicate instances of components of distributed application 600 that will be needed during the period of increased or peak load. In the example above, it was be determined that components 602C, 604C, 606B, and 608B were not needed, so these components where suspended and cards 300L, 300M, 300J and 300K were placed in power saving mode. Now assume that these components are again needed.

Control next passes to block 820. Block 820 signals the cards 300 needed to host the identified components to enter normal operation mode from power saving mode. Using the example above, cards 300L, 300M, 300J and 300K are placed in normal operation mode. Control then passes to block 822.

Block 822 initializes the needed components identified at block 818. Using the example above, components 602C, 604C, 606B, and 608B are initialized. Note that the manner in which a component and the operating system are initialized will vary based on the type of power saving mode, as described above.

Finally control passes to "END" block 824. Again, note that "START" block 814 and "END" block 824 are shown to illustrate the starting and ending point of flowchart 800B. However, flowchart 800B can loop repeatedly, or be executed at a certain interval, such as once every ten minutes.

Figure 9:
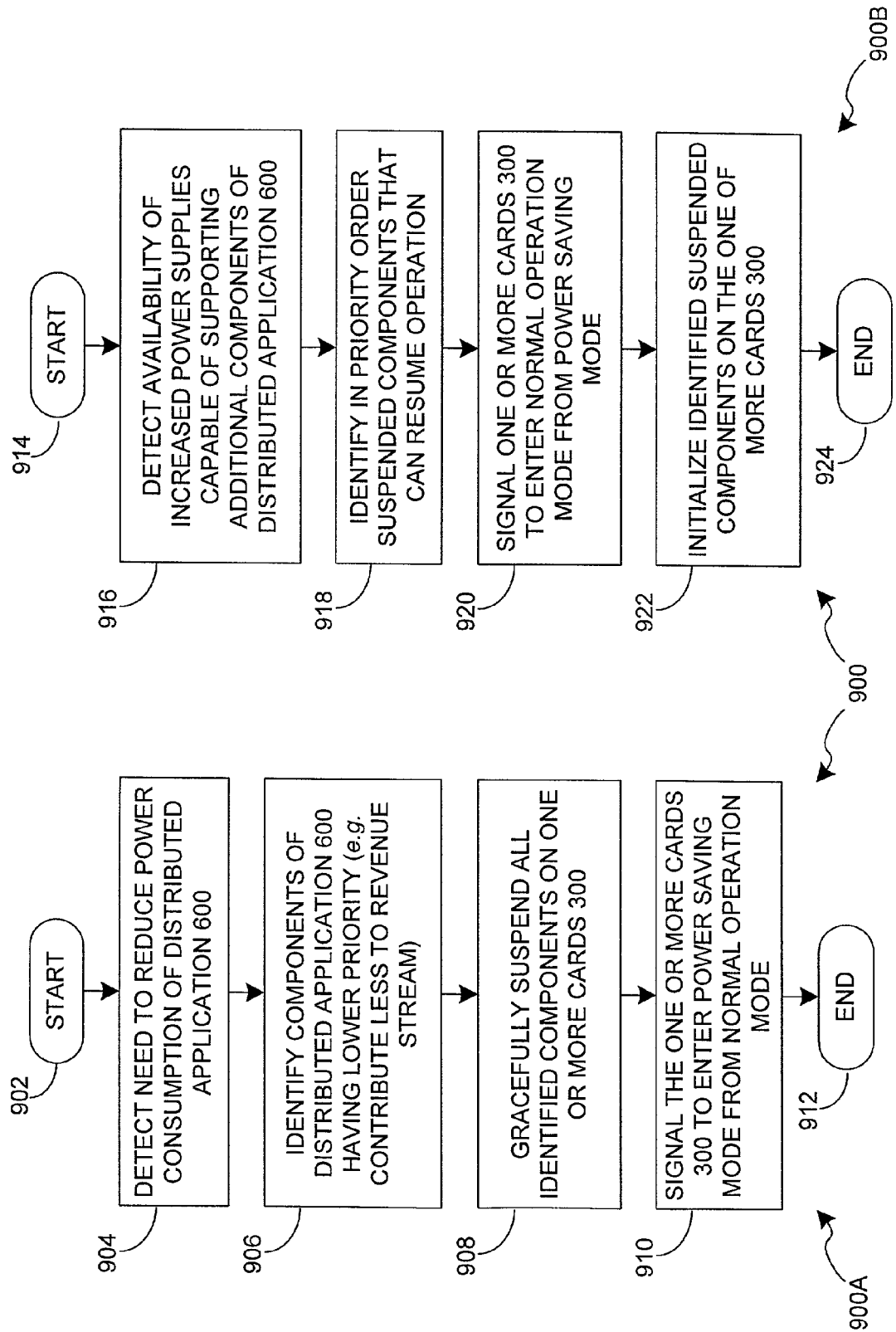
FIG. 9 is a flowchart showing a priority-based power consumption reduction algorithm, in accordance with the present invention.

FIG. 9 illustrates priority-based power consumption reduction algorithm 900. In FIG. 9, algorithm 900 is illustrated as a flowchart 900A that shows how power can be reduced when it is necessary reduce power consumption by suspending components in priority order, in accordance with the present invention. Flowchart 900B shows how suspended components can resume operation when power consumption can be increased, in accordance with the present invention.

Flowchart 900A starts at "START" block 902, and control passes to block 904. Block 904 detects a need to reduce power consumption. As noted above, such a need can occur due to a rolling blackout, an air conditioning failure, peak demand pricing, etc.

Next control passes to block 906, which identifies components of distributed application 600 having lower priority, such as components that contribute less to a revenue stream. For example, in FIG. 7, it may be determined that energy consumption must be reduced by 20%. Shipment tracking component 608 has the lowest priority, so components 608A and 608B can be suspended to curtail energy demand. Control then passes to block 908.

Block 908 gracefully suspends all components identified at block 906. Note that to place any particular card 300 in power saving mode, all components on that card must be identified as having a lower priority. In the example above, components 608A and 608B have been identified, and are gracefully suspended. Control then passes to block 910.

Block 910 signals the cards in which all components have been suspended to enter power saving mode from normal operation mode. Using the example above, components 608A and 608B were gracefully suspended, so cards 300D and 300K are placed in power saving mode.

Finally control passes to "END" block 912. Note that "START" block 902 and "END" block 912 are shown to illustrate the starting and ending point of flowchart 900A. In general, it will typically only be necessary to execute the steps shown in flowchart 900A when a change in power supply status is detected.

Flowchart 900B starts at "START" block 914, and control passes to block 916. Block 916 detects that increased power supplies are available and are capable of supporting additional components of distributed application 600 that were previously suspended.

Next control passes to block 918, which identifies in priority order, such as contribution to the revenue stream, which components should resume operation. In the example above, it was be determined that components 608A and 608B could be suspended, so these components where suspended and cards 300D and 300K were placed in power saving mode. Now assume that these components can resume operation because power supplies are sufficient.

Control next passes to block 920. Block 920 signals the cards 300 needed to host the identified components to enter normal operation mode from power saving mode. Using the example above, cards 300D and 300K are placed in normal operation mode. Control then passes to block 922.

Block 922 initializes the components identified at block 918. Using the example above, components 608A and 608B are initialized. Note that the manner in which a component and the operating system are initialized will vary based on the type of power saving mode, as described above.

Finally control passes to "END" block 924. Again, note that "START" block 914 and "END" block 924 are shown to illustrate the starting and ending point of flowchart 900B. In general, it will typically only be necessary to execute the steps shown in flowchart 900A when a change in power supply status is detected.

FIG. 10 is a flowchart 1000 that illustrates the minimal power-consuming redundant computing hardware algorithm, in accordance with the present invention. The algorithm starts at "START" block 1002, and control passes to block 1004.

Block 1004 detects an impending or actual failure of one of the cards 300. There are many ways known in the art to detect an impending failure. For example, an unexpected rise in the temperature of a CPU or other components may be detected, a large number of ECC or parity errors may be detected in memory or some other system component, or a significant performance degradation of components of distributed application 600 executing on the card 300 may be detected. There are also many ways known in the art to detect an actual failure. For example, certain types of faults may be detected, or the components of distributed application 600 may stop responding. After an impending or actual failure of a card 300 is detected at block 1004, control passes to block 1006.

Block 1006 identifies the components of distributed application 600 that are executing on the card 300 in which the actual or impending failure has been detected. Of course, if the failure is impending, the card 300 can be queried to determine which components are affected. If the failure has already occurred and the card 300 does not respond, the components can be determined by querying any other card 300 or component configured to track the assignment of components to host processor cards. Control then passes to block 1008.

Block 1008 signals cold spare 300N to enter normal operation mode from power saving mode. Control then passes to block 1010, where the components of distributed application 600 identified at block 1006 are initialized on card 300N. Control then passes to block 1012.

If the card 300 in which the actual or impending failure has been detected is still functional, block 1012 attempts to gracefully suspend or shut down all the components identified at block 1006. However, this may not be possible if the affected card 300 is not responding. Control then passes to block 1014, where the card 300 in which the actual or impending failure has been detected is signaled to enter hot swap mode from normal operation mode. Control then passes to "STOP" block 1016. At this point, the card 300 in which the actual or impending failure has been detected can be removed and replaced by a functioning card 300.

As is clearly evident from the above discussion, the present invention provides a number of benefits that reduce costs, increase reliability, and address the current realities associated with the generation and distribution of energy supplies. First, the present invention is capable of varying the energy usage of a distributed application in response to changing load levels by placing temporally unneeded hardware resources in a reduced power mode. Accordingly, energy usage can be reduced, thereby reducing costs. Reducing energy usage of computer systems hosting a distributed application also reduces the required amount of air conditioning, reducing costs even further.

Second, the present invention is capable of reducing energy consumption in response to unplanned events, such as rolling blackouts or air conditioning failures, or alternatively, to take advantage of peak period electricity pricing schemes. By suspending components having less contribution to a revenue stream by placing hardware resources hosting these resources in a reduced power mode, the present invention allows a distributed application to generate the maximum amount of revenue possible in view of diminished energy supplies.

Finally, the present invention provides redundant hardware that does not consume power until needed. By configuring a server system having one or more cold spares, components of a distributed application can be seamlessly shifted to a cold spare when an actual or impending failure is detected in a host processing card executing the applications.

Although the present invention has been described with reference to preferred embodiments, workers skilled in the art will recognize that changes may be made in form and detail without departing from the spirit and scope of the invention.

What is claimed is:

1. A priority-based method of reducing power consumption of a distributed application comprised of a plurality of components in response to an indication that power consumption must be reduced, wherein the plurality of components are hosted by a plurality of computing elements that can each enter a power saving mode, the method comprising:

detecting a need to reduce power consumption of the distributed application;

identifying in priority order components having a lower priority;

gracefully suspending all identified components on one or more of the plurality of computing elements; and signaling the one or more of the plurality of computing elements to enter a reduced power mode without shutting down the component and operating system.

2. The method of claim 1 wherein each component is identified as having a lower priority based on a contribution to a revenue stream of the component.

3. The method of claim 1 wherein the power saving mode is a suspend-to-RAM mode, and gracefully suspending all identified components on one or more of the plurality of computing elements comprises allowing the identified components to finish pending transactions.

4. The method of claim 1 wherein the power saving mode removes all power from the one or more of the plurality of computing elements, and gracefully suspending all identified components on one or more of the plurality of computing elements comprises:

allowing the identified components to finish pending transactions;

shutting down the identified components; and shutting down operating systems on the one or more of the plurality of computing elements.

5. The method of claim 1 and further comprising:

detecting availability of increased power supplies capable of supporting additional suspended components of the distributed application;

identifying in priority order higher priority suspended components that can resume operation in view of the availability of increased power supplies;

signaling one or more of the plurality of computing elements to enter a normal operation mode from the power saving mode; and initializing all identified components on the one or more of the plurality of computing elements.

6. The method of claim 5 wherein each suspended component is identified as having a higher priority based on a contribution to a revenue stream of the component.

7. The method of claim 5 wherein the power saving mode removes all power from the one or more of the plurality of computing elements, and initializing all identified components on the one or more of the plurality of computing elements comprises:
  loading the operating system on the one or more of the plurality of computing elements; and
  loading identified components on the one or more of the plurality of computing elements.

8. A computer usable medium having computer readable code embodied therein for causing a computer system to perform a method of reducing power consumption of a distributed application comprised of a plurality of components in response to an indication that power consumption must be reduced, wherein the plurality of components are hosted by a plurality of computing elements that can each enter a power saving mode, the computer program method comprising:
  detecting a need to reduce power consumption of the distributed application;
  identifying in priority order components having a lower priority;
  gracefully suspending all identified components on one or more of the plurality of computing elements; and
  signaling the one or more of the plurality of computing elements to enter a reduced power mode without shutting down the component and operating system.

9. The computer usable medium of claim 8 wherein each component is identified as having a lower priority based on a contribution to a revenue stream of the component.

10. The computer usable medium of claim 8 wherein the power saving mode is a suspend-to-RAM mode configured to allow the identified components to finish pending transactions.

11. The computer usable medium of claim 8 wherein the power saving mode removes all power from the one or more of the plurality of computing elements, and is configured to allow the identified components to finish pending transactions, shut down the identified components, shut down operating systems on the one or more of the plurality of computing elements.

12. The computer usable medium of claim 8 and further including:
  detecting availability of increased power supplies capable of supporting additional suspended components of the distributed application;
  identifying in priority order higher priority suspended components that can resume operation in view of the availability of increased power supplies;
  signaling one or more of the plurality of computing elements to enter a normal operation mode from the power saving mode; and
  initializing all identified components on the one or more of the plurality of computing elements.

13. The computer usable medium of claim 12 wherein each suspended component is identified as having a higher priority based on a contribution to a revenue stream of the component.

14. The computer usable medium of claim 9 wherein the power saving mode removes all power from the one or more of the plurality of computing elements, and is configured to load the operating system on the one or more of the plurality of computing elements, and load identified components on the one or more of the plurality of computing elements.

15. A computer system comprising:
  a backplane;
  a plurality of host processor cards coupled to the backplane, with the plurality of host processor cards hosting a distributed application comprised of a plurality of components; and
  a management unit coupled to the back plane, the management unit operable to signal each of the plurality of host processor cards to enter a power saving mode, and executing a program that:
  detects a need to reduce power consumption of the distributed application;
  identifies in priority order components having a lower priority;
  gracefully suspends all identified components on one or more of the plurality of host processing cards; and
  signals the one or more of the plurality of host processing cards to enter a reduced power mode without shutting down the component and operating system.

16. The computer system of claim 15 wherein the management unit is also operable to signal each of the plurality of host processor cards to enter a normal operation mode from the power saving mode, and the program executing on the management unit also:
  detects availability of increased power supplies capable of supporting additional suspended components of the distributed application;
  identifies in priority order higher priority suspended components that can resume operation in view of the availability of increased power supplies;
  signals one or more of the plurality of host processing cards to enter a normal operation mode from the power saving mode; and
  initializes all identified components on the one or more of the plurality of host processing cards.

17. A data center that hosts a distributed application comprised of a plurality of components, the data center comprising:
  a plurality of computer systems, each computer system comprising:
    a backplane;
    a plurality of host processor cards coupled to the backplane, with the plurality of host processor cards hosting components of the distributed application; and
    a management unit coupled to the back plane, the management unit operable to signal each of the plurality of host processor cards to enter a power saving mode; and
  a load management system in communication with each of the management units of the plurality of computer systems, the load management system executing a program that:
    detects a need to reduce power consumption of the distributed application;
    identifies in priority order components having a lower priority; signals one or more of the plurality of host processor cards in one or more of the plurality of computer systems to gracefully suspend all identified components on the one or more of the plurality of host processor cards in the one or more of the plurality of computer systems; and
    signals the management units in the one or more of the plurality of computer systems to collectively signal the one or more of the plurality of host processor cards to enter a reduced power mode without shutting down the component and operating system.

18. The data center of claim 17 wherein each management unit is also operable to signal each of the plurality of host processor cards to enter a normal operation mode from the power saving mode, and the program executing on the load management unit also:

detects availability of increased power supplies capable of supporting additional suspended components of the distributed application;

identifies in priority order higher priority suspended components that can resume operation in view of the availability of increased power supplies;

signals the management units in the one or more of the plurality of computer systems to collectively signal one or more of the plurality of host processor cards to enter a normal operation mode from the power saving mode; and signals one or more of the plurality of host processor cards in one or more of the plurality of computer systems to initializes all identified needed instances of components on the one or more of the plurality of host processor cards in the one or more of the plurality of computer systems.

* * * * *